(12) United States Patent
Chen (10) Patent No.: US 10,866,492 B2
(45) Date of Patent: Dec. 15, 2020

(54) METHOD AND SYSTEM FOR CONTROLLING TRACKING PHOTOGRAPHING OF STABILIZER (71) Applicant: HOHEM TECHNOLOGY CO., LTD., Shenzhen (CN)

(72) Inventor: Min Chen, Shenzhen (CN)

(73) Assignee: HOHEM TECHNOLOGY CO., LTD, Shenzhen (CN)

( * ) Notice: Subject to any disclaimer, the term of this patent is extended or adjusted under 35 U.S.C. 154(b) by 160 days.

(21) Appl. No.: 16/157,720

(22) Filed: Oct. 11, 2018

(65) Prior Publication Data

US 2019/0041729 A1    Feb. 7, 2019

Related U.S. Application Data (63) Continuation of application No. PCT/CN2016/079008, filed on Apr. 12, 2016.

(51) Int. Cl.
*G03B 17/56*  (2006.01)
*H04N 5/232*  (2006.01)
*G06T 7/70*   (2017.01)

(52) U.S. Cl.
CPC ......... *G03B 17/561* (2013.01); *H04N 5/2328* (2013.01); *H04N 5/23203* (2013.01); *H04N 5/23299* (2018.08); *H04N 5/232411* (2018.08); *G06T 7/70* (2017.01)

(58) Field of Classification Search
CPC ... G03B 17/561; H04N 5/23299; F16M 13/02
See application file for complete search history.

(56) References Cited

U.S. PATENT DOCUMENTS

| 5,963,749 A | 10/1999 | Nicholson |
| 8,179,078 B2 | 5/2012 | Sidman |
| 2014/0270744 A1* | 9/2014 | Webb ................. H04N 5/23261 396/55 |
| 2014/0281395 A1 | 9/2014 | Albrekht |

FOREIGN PATENT DOCUMENTS

| CN | 201403142 Y | 4/2009 |
| CN | 203567947 U | 6/2013 |
| CN | 104048141 A | 6/2014 |
| CN | 104049440 A | 9/2014 |

* cited by examiner

*Primary Examiner* — Minh Q Phan
(74) *Attorney, Agent, or Firm* — Robert L. Stearns; Dickinson Wright PLLC (57) ABSTRACT A method and a system for controlling tracking photographing of a stabilizer are provided. The method for controlling the tracking photographing includes: acquiring angle values of the pitch axle, the roll axle, and the heading axle in real time; receiving a tracking photographing mode instruction, and allowing the stabilizer to enter a tracking photographing mode according to the tracking photographing mode instruction; receiving a target position parameter of a photographing target in real time; calculating angle values to be adjusted of the pitch axle, the roll axle, and the heading axle according to the target position parameter and the angle values of the pitch axle, the roll axle, and the heading axle; and adjusting angles of the pitch axle, the roll axle, and the heading axle according to the angle values to be adjusted to locate the photographing target at a lens center of the photographing device.

8 Claims, 4 Drawing Sheets

METHOD AND SYSTEM FOR CONTROLLING TRACKING PHOTOGRAPHING OF STABILIZER

CROSS-REFERENCE TO RELATED APPLICATIONS

This application is a continuation of International Patent Application No. PCT/CN2016/079008 with an international filing date of Apr. 12, 2016, designating the United States, now pending, the contents of which are incorporated herein by reference.

TECHNICAL FIELD

The present application relates to the technical field of stabilizer, and more particularly to a method and a system for controlling tracking photographing of a stabilizer.

BACKGROUND

Stabilizer, also called handheld gimbal, generally includes: a mounting seat configured to fix a photographing device, such as a mobile phone, a digital camera, a video camera, and the like, a support rod (generally a handheld support rod) configured to support the mounting seat, and a pitch axle, a roll axle, and a heading axle configured to always keep the photographing device from jitter in the horizontal and the vertical directions. The pix axle, the roll axle, and the heading axle is driven by corresponding drive motors to adjust angles thereof, such that the photographing device fixed at the mounting seat can be maintained stable.

However, the stabilizer in the prior art generally only has the function of maintaining the photographing device stable in the horizontal direction and the vertical direction to keep the images in the lens from jitter. When the tracking photographing is performed on a photographing target, the user is required to rotate an arm by himself/herself to make the lens of the photographing device to align with the photographing target. Because the rotation angle and velocity of the human's hand have relatively large errors, it cannot be ensured that the photographing target is always located at the lens center.

SUMMARY

It is an object of the present application to provide a method and a system for controlling tracking photographing of a stabilizer, which aim at solving the problem that the stabilizer in the prior art generally only has the function of maintaining the photographing device stable in the horizontal direction and the vertical direction to keep the images in the lens from jitter, when the tracking photographing is performed on a photographing target, the user is required to rotate an arm by himself/herself to make the lens of the photographing device to align with the photographing target; because the rotation angle and velocity of the human's hand have relatively large errors, it cannot be ensured that the photographing target is always located at the lens center.

The present application is realized as follows: a method for controlling tracking photographing of a stabilizer is provided. The stabilizer comprises: a mounting seat configured to mount a photographing device; a support rod configured to support the mounting seat; and a pitch axle, a roll axle, and a heading axle configured to keep the photographing device from jitter in a horizontal direction and a vertical direction. The method for controlling the tracking photographing comprises:

acquiring angle values of the pitch axle, the roll axle, and the heading axle in real time;

receiving a tracking photographing mode instruction, and allowing the stabilizer to enter a tracking photographing mode according to the tracking photographing mode instruction;

receiving a target position parameter of a photographing target in real time;

calculating angle values to be adjusted of the pitch axle, the roll axle, and the heading axle according to the target position parameter and the angle values of the pitch axle, the roll axle, and the heading axle; and adjusting angles of the pitch axle, the roll axle, and the heading axle according to the angle values to be adjusted to locate the photographing target at a lens center of the photographing device.

In an embodiment, the operation of calculating angle values to be adjusted of the pitch axle, the roll axle, and the heading axle according to the target position parameter and the angle values of the pitch axle, the roll axle, and the heading axle specifically comprises:

acquiring a lens center coordinate of the photographing device;

calculating a deviation of the photographing target relative to the lens center according to the target position parameter and the lens center coordinate;

calculating the angle value to be adjusted of the pitch axle according to a vertical component of the deviation; and calculating the angle values to be adjusted of the roll axle and the heading axle according to a horizontal component of the deviation.

The present application further provides a system for controlling tracking photographing of a stabilizer, the stabilizer comprising: a mounting seat configured to mount a photographing device; a support rod configured to support the mounting seat; and a pitch axle, a roll axle, and a heading axle configured to keep the photographing device from jitter in a horizontal direction and a vertical direction. The system for controlling the tracking photographing comprises:

an angle acquisition module, configured to acquire angle values of the pitch axle, the roll axle, and the heading axle in real time;

a target identifier module, configured to receive a tracking photographing mode instruction and allow the stabilizer to enter a tracking photographing mode according to the tracking photographing mode instruction;

a communication module, configured to receive a target position parameter of a photographing target in real time;

a target calculator module, configured to calculate angle values to be adjusted of the pitch axle, the roll axle, and the heading axle according to the target position parameter and the angle values of the pitch axle, the roll axle, and the heading axle;

an angle adjustment module, configured to adjust angles of the pitch axle, the roll axle, and the heading axle according to the angle values to be adjusted to locate the photographing target at a lens center of the photographing device.

In an embodiment, the target calculator module specifically comprises:

an acquisition module, configured to acquire a lens center coordinate of the photographing device;

a first calculator unit, configured to calculate a deviation of the photographing target relative to the lens center according to the target position parameter and the lens center coordinate;

a second calculator unit, configured to calculate the angle value to be adjusted of the pitch axle according to a vertical component of the deviation; and a third calculator unit, configured to calculate the angle values to be adjusted of the roll axle and the heading axle according to a horizontal component of the deviation.

The method and the system for controlling the tracking photographing of the stabilizer provided by the present application, compared with the prior art, have the following beneficial effects:

by acquiring the target position parameter of the photographing target and the angle values of the pitch axle, the roll axle, and the heading axle, calculating the angle values to be adjusted of the pitch axle, the roll axle, and the heading axle according to the acquired parameters, and adjusting the angles of the pitch axle, the roll axle, and the heading axle according to the angle values to be adjusted, the photographing target can be always located at the lens center of the photographing device, thereby enabling the stabilizer to have the tracking photographing function. The control method is simple, has high control accuracy, and is adapted for wide application.

DETAILED DESCRIPTION OF THE EMBODIMENTS

The present application will be further described in detail below with reference to the accompanying drawings and embodiments. It is understood that the specific embodiments described herein are merely illustrative and not intended to limit the present application.

The present application is achieved by a stabilizer. The stabilizer comprises: a mounting seat configured to mount a photographing device; a support rod configured to support the mounting seat; and a pitch axle, a roll axle, and a heading axle configured to keep the photographing device from jitter in a horizontal direction and a vertical direction; correspondingly, the stabilizer further comprises a pitch axle drive motor, a roll axle drive motor, and a heading axle drive motor which are in connection with the pitch axle, the roll axle, and the heading axle in a manner of one-to-one correspondence to perform the drive control of the pitch axle, the roll axle, and the heading axle.

The pitch axle drive motor is mainly configured to control a pitch angle of the pitch axle in the vertical direction to allow the photographing device to produce a moving component in the vertical direction; the roll axle drive motor is mainly configured to control a moving angle of the roll axle in the horizontal direction to allow the photographing device to produce a moving component in the horizontal direction; and the heading axle drive motor is mainly configured to control a rotation angle of the heading axle in the horizontal direction to allow the photographing device to be rotatable in the horizontal direction.

In this embodiment, moving angles of the pitch axle and the roll axle may be set according to practical requirements, and the rotation angle of the heading axle is 360° in the horizontal direction.

Figure 1:
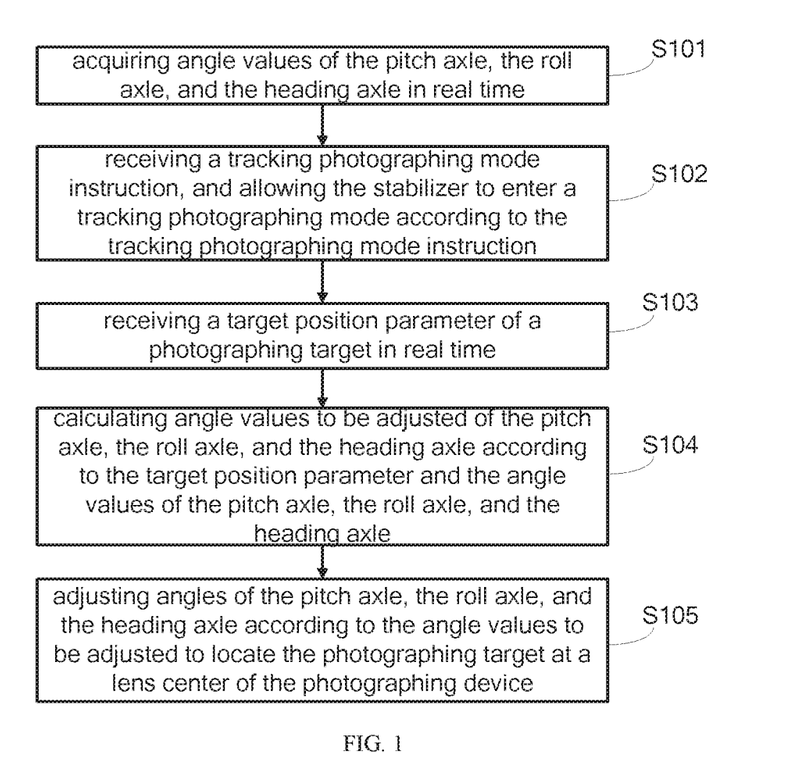
FIG. 1 is a flow chart of a method for controlling tracking photographing of a stabilizer provided by an embodiment of the present application.

FIG. 1 is a flow chart of a method for controlling tracking photographing of a stabilizer provided by an embodiment of the present application.

As shown in FIG. 1, the method for controlling the tracking photographing of the stabilizer provided by this embodiment comprises:

Operation S101: acquiring angle values of the pitch axle, the roll axle, and the heading axle in real time;

In a specific application, the angle value data of the pitch axle, the roll axle, and the heading axle are provided by the corresponding pitch axle drive motor, roll axle drive motor, and heading axle drive motor.

Operation S102: receiving a tracking photographing mode instruction, and allowing the stabilizer to enter a tracking photographing mode according to the tracking photographing mode instruction.

The tracking photographing in the present application specifically means: when the stabilizer enters the tracking photographing mode, if the position of the photographing target changes and the photographing target is therefore not located at the lens center of the photographing device, the pitch axle drive motor, the roll axle drive motor, and the heading axle drive motor of the stabilizer will drive and control the angle values of the corresponding pitch axle, roll axle, and heading axle to change, such that the lens of the photographing device at the mounting seat of the stabilizer tracks and moves along the position change of the photographing target, such that it is ensured that the photographing target is located at the lens center of the photographing device.

In a specific application, the stabilizer further includes other working modes, such as a normal photographing mode, a continuous photographing mode, and a power saving photographing mode.

In this embodiment, the normal photographing mode specifically means that the photographing device can only capture the photographing target that the lens is currently aligned, and when the user needs to capture other targets, it is necessary to manually change the direction where the lens of the photographing device is aligned.

The continuous photographing mode specifically means that when the stabilizer controls the photographing device to perform photographing operation, the photographing device can continuously take a plurality of photographs in a preset time period during the execution of one photographing operation.

The power saving photographing mode specifically means that when the stabilizer enters the power saving photographing mode, if the user does not perform any operation on the photographing device through the stabilizer within a preset time period, the stabilizer will control the photographing device to enter the sleep mode status. Taking a touch-screen mobile phone as an example, when a touch-screen mobile phone is selected as the photographing device, if the user does not perform any operation on the touch-screen mobile phone through the stabilizer within a preset time period, the stabilizer will control the display screen of the touch-screen mobile phone to enter a black screen status.

Operation S103: receiving a target position parameter of a photographing target in real time.

In this embodiment, the target position parameter refers to a coordinate change value of the photographing target on a lens or an image display interface of the photographing device. The target position parameter is determined by the photographing device according to a continuous coordinate change value of the photographing target on the lens or image display interface within the preset time period.

In a specific application, the preset time period can be set according to practical requirement and is specifically dependent on the accuracy of the tracking photographing required by the user.

In this embodiment, an acquisition period of the target position parameter is 50 ms per time (that is 20 coordinate change values are acquired in one second)

Reasonable setting of the acquisition period of the target position parameter can reduce the calculation amount of the photographing device and the calculation of the floating point number, improve the performance of the photographing device itself, and also improve the data transmission rate that may be generated when the target position parameter is transmitted to the stabilizer.

In one embodiment, before the operation S103, the method for controlling the tacking photographing further comprises:

receiving a connection instruction, and establishing communication connection with the photographing device according to the connection instruction.

In a specific application, the communication connection means between the stabilizer and the photographing device may be a wired connection means based on a communication cable, or a wireless connection means based on Bluetooth, a wireless network, or other wireless communication technologies.

In one embodiment, the method for controlling the tacking photographing further comprises:

controlling the pitch axle, the roll axle, and the heading axle to stop moving, and triggering the photographing device to perform photographing operation when a photographing instruction is received;

controlling extension/retraction of the support rod when a support rod extending/retracting instruction is received; and disconnecting the communication connection with the photographing device when a disconnection instruction is received.

Operation S104: calculating angle values to be adjusted of the pitch axle, the roll axle, and the heading axle according to the target position parameter and the angle values of the pitch axle, the roll axle, and the heading axle.

In a specific application, the calculated angle values to be adjusted of the pitch axle, the roll axle, and the heading axle can all be 0, which means that the adjustment of the coordinate of the photographing target in a certain direction is not needed.

Operation S105: adjusting angles of the pitch axle, the roll axle, and the heading axle according to the angle values to be adjusted to locate the photographing target at a lens center of the photographing device.

In a specific application, when the photographing device is a mobile phone, a tablet, a digital camera, a video camera, or the like with a display interface (usually a liquid crystal display), the meaning of lens center can also be equivalently understood as the center of the display interface.

Figure 2:
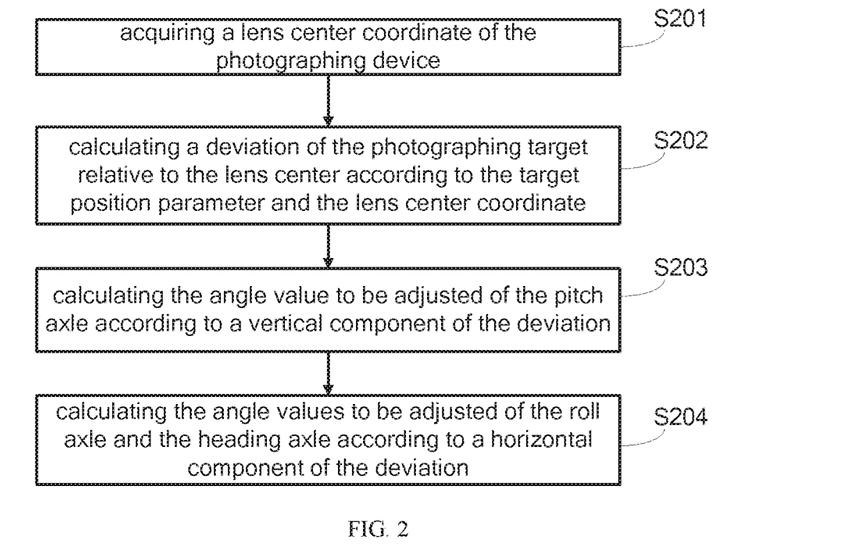
FIG. 2 is a specific block flowchart of operation S104 provided by an embodiment of the present application.

FIG. 2 is a flow chart of a method for controlling tracking photographing of a stabilizer according to an embodiment of the present application.

As shown in FIG. 2, this embodiment is further detail of operation S104, and the operation S104 specifically comprises:

Operation S201: acquiring a lens center coordinate of the photographing device.

In an embodiment, before the operation S201, the following operation is further comprised:

establishing a rectangular coordinate system by using a left vertical side and a lower horizontal side of a lens area of the photographing device as coordinate axes.

In a specific application, the rectangular coordinate system can also be established by using a center point of the lens as a coordinate origin and using two central axes that pass through the coordinate origin and are respectively parallel to two vertical sides at the left and the right and the two horizontal sides at the top and the bottom as the coordinate axes.

Operation S202: calculating a deviation of the photographing target relative to the lens center according to the target position parameter and the lens center coordinate.

In this embodiment, the deviation is a vector sum of the horizontal deviation and the vertical deviation of the photographing target relative to the lens center.

Operation S203: calculating the angle value to be adjusted of the pitch axle according to a vertical component of the deviation.

In a specific application, if the deviation of the photographing target in the vertical direction is 0, the angle to be adjusted of the pitch axle is 0.

In an embodiment, the angle to be adjusted of the pitch axle ranges from 0 to 180°.

Operation S204: calculating the angle values to be adjusted of the roll axle and the heading axle according to a horizontal component of the deviation.

In a specific application, if the deviation of the photographing target in the horizontal direction is 0, the angle to be adjusted of the roll axle is 0.

In an embodiment, the angle to be adjusted of the roll axle ranges from 0 to 180°.

In a specific application, when the photographing target horizontally rotates relative to the lens center, the angle to be adjusted of the heading axle is calculated according to the horizontal component of the deviation in the horizontal direction.

In a specific application, the angle to be adjusted of the heading axle ranges from 0 to 360°.

In a practical application, the heading axle can also continuously track the photographing target to horizontally rotate for any angle according to requirement.

Figure 3:
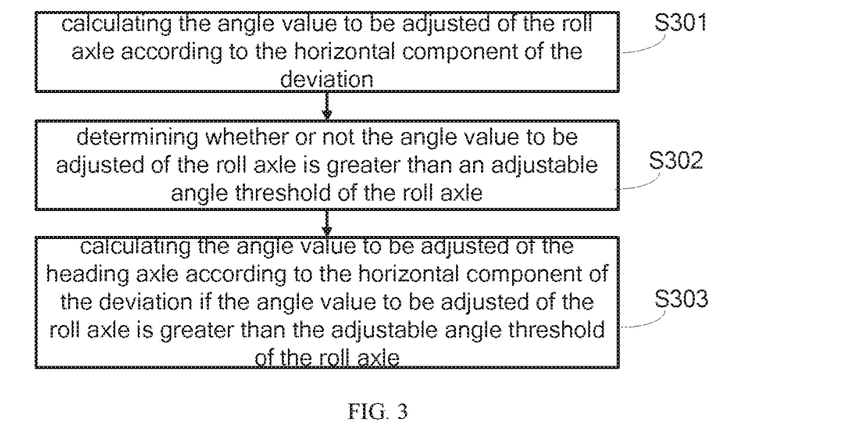
FIG. 3 is a specific block flowchart of operation S104 provided by an embodiment of the present application.

FIG. 3 is a flow chart of a method for controlling tracking photographing of a stabilizer provided by another embodiment of the present application.

As shown in FIG. 3, the present application is further detail of the operation S204 and the operation S204 specifically comprises:

Operation S301: calculating the angle value to be adjusted of the roll axle according to the horizontal component of the deviation.

Operation S302: determining whether or not the angle value to be adjusted of the roll axle is greater than an adjustable angle threshold of the roll axle.

In a specific application, operation S302 means that when the horizontal displacement of the photographing target relative to the lens center is too large, the photographing target cannot be located at the lens center, even if the roll axle is adjusted according to the maximum adjustable angle. In that case, it is required to rotate the heading axle, such that the lens center of the photographing device is controlled by the stabilizer to realign with the photographing target.

The adjustable angle threshold in this embodiment refers to a maximum adjustable angle of the roll axle.

Operation S303: calculating the angle value to be adjusted of the heading axle according to the horizontal component of the deviation if the angle value to be adjusted of the roll axle is greater than the adjustable angle threshold of the roll axle.

In this embodiment, the horizontal component of the deviation in operation S303 refers to the horizontal component of the photographing target relative to the lens center.

Figure 4:
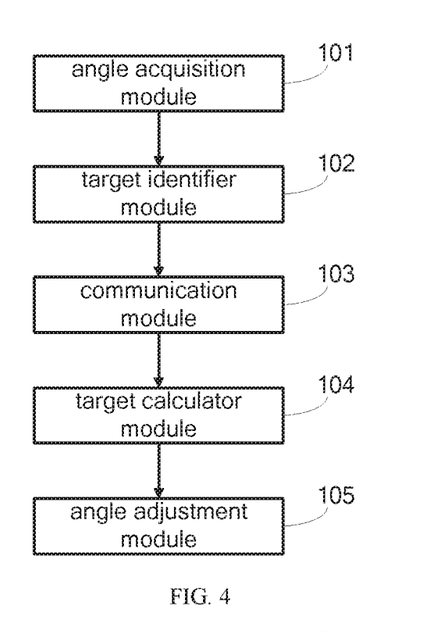
FIG. 4 is a structural block diagram of a system for controlling tracking photographing of a stabilizer provided by an embodiment of the present application.

FIG. 4 is a structural block diagram of a system for controlling tracking photographing of a stabilizer provided by an embodiment of the present application.

As shown in FIG. 4, the system for controlling the tracking photographing of the stabilizer provided by this embodiment comprises:

an angle acquisition module 101, configured to acquire angle values of the pitch axle, the roll axle, and the heading axle in real time.

In a specific application, tilt data of the pitch axle, the roll axle, and the heading axle can be detected by a plurality of attitude detecting board provided in the pitch axle drive motor, the roll axle motor, and the heading axle motor, and converted into corresponding angle values by corresponding processors. All the pitch axle drive motor, the roll axle motor, and the heading axle motor can be provided with independent drive processors, and the angle acquisition module 101 may be a functional unit in a main processor that performs overall control of each independent drive processor.

a target identifier module 102, configured to receive a tracking photographing mode instruction and allow the stabilizer to enter a tracking photographing mode according to the tracking photographing mode instruction;

In a specific application, the target recognition module 102 may be a functional unit in the main processor of the stabilizer, or may be a mode selection rocker or a mechanical control button arranged on the support rod.

In an embodiment, the target identifier module 102 is a five-way rocker that can be rocked upward, downward, leftward, and rightward, and pressed down, and is configured to allow the user to select among the five working modes of the stabilizer.

a communication module 103, configured to receive a target position parameter of a photographing target in real time;

In a specific application, the communication module 103 can be a functional unit in the main processor of the stabilizer, or alternatively a wired connection module based on a communication cable, or alternatively a wireless connection module based on Bluetooth, a wireless network, or other wireless communication technologies.

In an embodiment, the communication module 103 is further configured to receive a connection instruction to establish communication connection with the photographing device according to the connection instruction.

In this embodiment, the communication connection between the stabilizer and the photographing device via the communication module is Bluetooth connection.

In this embodiment, the communication module 103 is further configured to disconnect the communication connection with the photographing device according to a disconnection instruction when the disconnection instruction is received.

a target calculator module 104, configured to calculate angle values to be adjusted of the pitch axle, the roll axle, and the heading axle according to the target position parameter and the angle values of the pitch axle, the roll axle, and the heading axle;

In a specific application, the target calculator module 104 may be an algorithm program written in the main processor of the stabilizer, or may be a dedicated computing chip that internally writes the algorithm program, or may be computing chips respectively in connection with the independent drive processors in the pitch axle drive motor, the roll axle drive motor, and the heading axle drive motor.

an angle adjustment module 105, configured to adjust angles of the pitch axle, the roll axle, and the heading axle according to the angle values to be adjusted to always locate the photographing target at a lens center of the photographing device;

In a specific application, the angle adjustment module 105 may be a functional unit in the main processor of the stabilizer, or may be independent drive processors in the pitch axle drive motor, the roll axle drive motor, and the heading axle drive motor.

Figure 5:
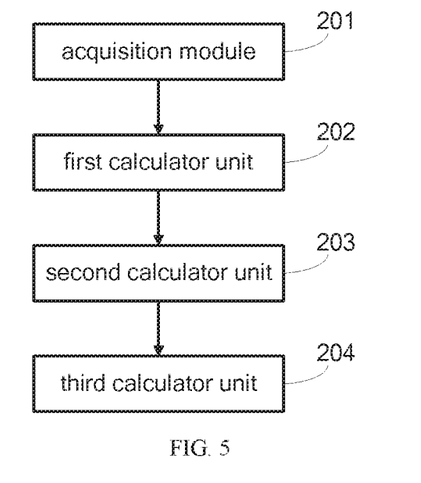
FIG. 5 is a specific structural block diagram of a target calculator module 104 provided by an embodiment of the present application.

FIG. 5 is a specific structural block diagram of a target calculator module 104 provided by an embodiment of the present application.

As shown in FIG. 5, this embodiment is further detail of the target calculator module 104, in this embodiment, the target calculator module 104 specifically comprises:

an acquisition module 201, configured to acquire a lens center coordinate of the photographing device;

In this embodiment, the acquisition module 201 is a functional unit in the target calculator module 104 that is in connection with the communication module 103.

a first calculator unit 202, configured to calculate a deviation of the photographing target relative to the lens center according to the target position parameter and the lens center coordinate;

a second calculator unit 203, configured to calculate the angle value to be adjusted of the pitch axle according to a vertical component of the deviation; and a third calculator unit 204, configured to calculate the angle values to be adjusted of the roll axle and the heading axle according to a horizontal component of the deviation.

In this embodiment, the target calculator module 104 is the main processor of the stabilizer, and the first calculator unit 202, the second calculator unit 203, and the third calculator unit 204 are all functional units in the main processor.

Figure 6:
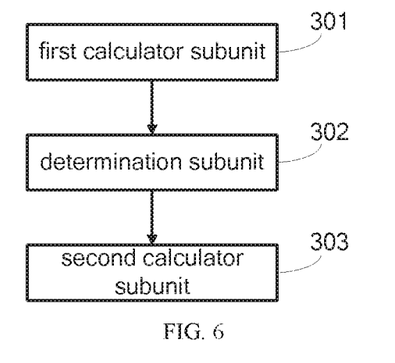
FIG. 6 is a specific structural block diagram of a third calculator unit 204 provided by an embodiment of the present application.

FIG. 6 is a specific structural block diagram of a third calculator unit 204 provided by an embodiment of the present application.

As shown in FIG. 6, this embodiment is further detail of the third calculator unit 204, in this embodiment, the third calculator unit 204, specifically comprises:

a first calculator subunit 301, configured to calculate the angle value to be adjusted of the roll axle according to the horizontal component of the deviation;

In a specific application, the first calculator subunit 301 may be a functional unit in the main processor of the stabilizer, or may be a drive processor in the roll axle drive motor.

a determination subunit 302, configured to determine whether or not the angle value to be adjusted of the roll axle is greater than an adjustable angle threshold of the roll axle; and a second calculator subunit 303, configured to calculate the angle value to be adjusted of the heading axle according to the horizontal component of the deviation if the angle value to be adjusted of the roll axle is greater than the adjustable angle threshold of the roll axle.

In a specific application, the second calculator subunit 303 may be a functional unit in the main processor of the stabilizer, or may be a drive processor in the heading axle drive motor.

In an embodiment, the system for controlling the tracking photographing of the stabilizer further comprises:

a photographing controller module, configured to control the pitch axle, the roll axle, and the heading axle to stop moving and trigger the photographing device to perform photographing operation when a photographing instruction is received; and an extension/retraction control module, configured to control extension/retraction of the support rod when a support rod extending/retracting instruction is received.

In a specific application, the photographing control module may be a functional module in the main controller of the stabilizer, or alternatively, a mechanical button arranged on the support rod of the stabilizer and configured to quickly trigger the photographing device to take a picture. The extension/retraction control module is a functional module in the main controller of the stabilizer, or alternatively, a mechanical button configured to trigger the extension/retraction of the support rod.

Figure 7:
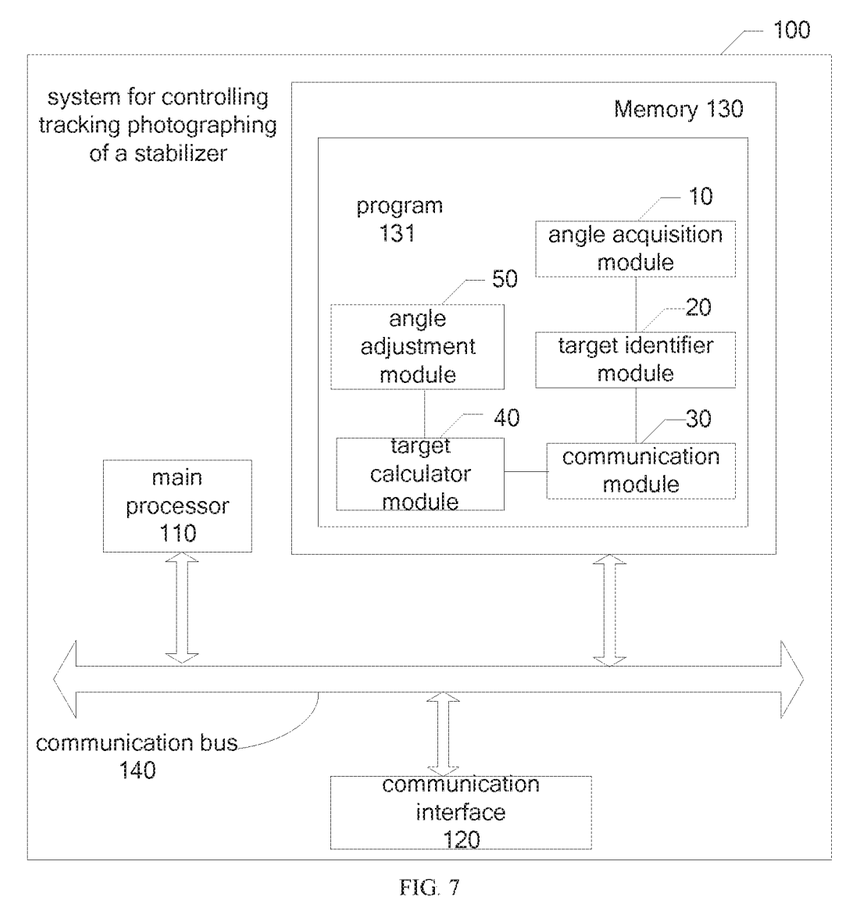
FIG. 7 is a structural block diagram of a system for controlling tracking photographing of a stabilizer provided by another embodiment of the present application.

FIG. 7 is a structural block diagram of a system for controlling tracking photographing of a stabilizer provided by another embodiment of the present application.

As shown in FIG. 7, the system 100 for controlling the tracking photographing of the stabilizer provided by this embodiment comprises:

a main processor 110, a communication interface 120, a memory 130, and a communication bus 140;

where, the main processor 110, the communication interface 120, and the memory 130 communicate with one another through the communication bus 140;

the communication interface 120 is configured to communicate with a photographing device;

the main processor 110 is configured to execute a program 131;

the memory 130 is configured to store the program 131;

the program 131 comprises:

an angle acquisition module 10, configured to acquire angle values of the pitch axle, the roll axle, and the heading axle in real time;

a target identifier module 20, configured to receive a tracking photographing mode instruction and allow the stabilizer to enter a tracking photographing mode according to the tracking photographing mode instruction;

a communication module 30, configured to receive a target position parameter of a photographing target in real time;

a target calculator module 40, configured to calculate angle values to be adjusted of the pitch axle, the roll axle, and the heading axle according to the target position parameter and the angle values of the pitch axle, the roll axle, and the heading axle;

an angle adjustment module 50, configured to adjust angles of the pitch axle, the roll axle, and the heading axle according to the angle values to be adjusted to locate the photographing target at a lens center of the photographing device.

A person skilled in the art can clearly understand that for the convenience and conciseness of the description, the specific working process of the system, the device, and the unit described above can refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative, for example, the division of the modules is only a logical function division; and in actual implementation, there may be other division manners, for example, multiple modules or components may be combined or may be integrated into another system, or some features can be ignored or not executed. In addition, the mutual coupling or direct coupling or communication connection shown or discussed may be an indirect coupling or communication connection through some communication interfaces, devices, or units, and may be in an electrical, mechanical, or other form.

The units described as separate components may or may not be physically separated, and the components displayed as units may or may not be physical units, that is, may be located in one place, or may be distributed to multiple network units. Some or all of the units may be selected according to actual requirements to achieve the purpose of the technical solution of the embodiment.

In addition, functional modules or units in embodiments of the present application may be integrated into one processing module or unit, or may exist physically separately or may be integrated by two or more.

The functions, if implemented in the form of software functional modules or units and sold or used as separate products, may be stored in a computer readable storage medium. Based on such understanding, the technical solution of the present application, which is essential or contributes to the prior art, or a part of the technical solution, may be embodied in the form of a software product, which is stored in a storage medium and includes instructions used to cause a computer device (which may be a personal computer, server, or network device, etc.) to perform all or a part of the operations of the methods described in various embodiments of the present application. The foregoing storage medium includes: a U disk, a mobile hard disk, a read-only memory (ROM), a random access memory (RAM), a magnetic disk, or an optical disk, and the like, which can store program code.

The above are only the preferred embodiments of the present application, and are not intended to limit the present application. Any modifications, equivalents, and improvements made within the spirit and scope of the present application should be included in the scope of the present application.

What is claimed is:

1. A method for controlling tracking photographing of a stabilizer, the method comprising the steps of:

providing a stabilizer, the stabilizer comprising:

a mounting seat configured to mount a photographing device;

a support rod configured to support the mounting seat; and a pitch axle, a roll axle, and a heading axle configured to keep the photographing device from jitter in a horizontal direction and a vertical direction;

acquiring angle values of the pitch axle, the roll axle, and the heading axle in real time;

receiving a tracking photographing mode instruction, and allowing the stabilizer to enter a tracking photographing mode according to the tracking photographing mode instruction;

receiving a target position parameter of a photographing target in real time;

calculating angle values to be adjusted of the pitch axle, the roll axle, and the heading axle according to the target position parameter and the angle values of the pitch axle, the roll axle, and the heading axle; and adjusting angles of the pitch axle, the roll axle, and the heading axle according to the angle values to be adjusted to locate the photographing target at a lens center of the photographing device;

wherein said step of calculating angle values to be adjusted of the pitch axle, the roll axle, and the heading axle according to the target position parameter and the angle values of the pitch axle, the roll axle, and the heading axle comprises:

acquiring a lens center coordinate of the photographing device;

calculating a deviation of the photographing target relative to the lens center according to the target position parameter and the lens center coordinate;

calculating the angle value to be adjusted of the pitch axle according to a vertical component of the deviation; and calculating the angle values to be adjusted of the roll axle and the heading axle according to a horizontal component of the deviation.

2. The method of claim 1, wherein the operation of calculating the angle values to be adjusted of the roll axle and the heading axle according to the horizontal component of the deviation, comprises:

calculating the angle value to be adjusted of the roll axle according to the horizontal component of the deviation;

determining whether or not the angle value to be adjusted of the roll axle is greater than an adjustable angle threshold of the roll axle; and calculating the angle value to be adjusted of the heading axle according to the horizontal component of the deviation if the angle value to be adjusted of the roll axle is greater than the adjustable angle threshold of the roll axle.

3. The method of claim 1, wherein before the operation of receiving the target position parameter of the photographing target in real time, the method further comprises:

receiving a connection instruction, and establishing communication connection with the photographing device according to the connection instruction.

4. The method of claim 3, wherein the method for controlling the tracking photographing further comprises:

controlling the pitch axle, the roll axle, and the heading axle to stop moving, and triggering the photographing device to perform photographing operation when a photographing instruction is received;

controlling extension/retraction of the support rod when a support rod extending/retracting instruction is received; and disconnecting the communication connection with the photographing device when a disconnection instruction is received.

5. A system for controlling tracking photographing of a stabilizer, the stabilizer comprising:

a mounting seat configured to mount a photographing device;

a support rod configured to support the mounting seat; and a pitch axle, a roll axle, and a heading axle configured to keep the photographing device from jitter in a horizontal direction and a vertical direction;

wherein the system for controlling the tracking photographing comprises:

an angle acquisition module, configured to acquire angle values of the pitch axle, the roll axle, and the heading axle in real time;

a target identifier module, configured to receive a tracking photographing mode instruction and allow the stabilizer to enter a tracking photographing mode according to the tracking photographing mode instruction;

a communication module, configured to receive a target position parameter of a photographing target in real time;

a target calculator module, configured to calculate angle values to be adjusted of the pitch axle, the roll axle, and the heading axle according to the target position parameter and the angle values of the pitch axle, the roll axle, and the heading axle;

an angle adjustment module, configured to adjust angles of the pitch axle, the roll axle, and the heading axle according to the angle values to be adjusted to locate the photographing target at a lens center of the photographing device;

wherein the target calculator module comprises:

an acquisition module, configured to acquire a lens center coordinate of the photographing device;

a first calculator unit, configured to calculate a deviation of the photographing target relative to the lens center according to the target position parameter and the lens center coordinate;

a second calculator unit, configured to calculate the angle value to be adjusted of the pitch axle according to a vertical component of the deviation; and a third calculator unit, configured to calculate the angle values to be adjusted of the roll axle and the heading axle according to a horizontal component of the deviation.

6. The system of claim 5, wherein the third calculator unit comprises:

a first calculator subunit, configured to calculate the angle value to be adjusted of the roll axle according to the horizontal component of the deviation;

a determination subunit, configured to determine whether or not the angle value to be adjusted of the roll axle is greater than an adjustable angle threshold of the roll axle; and a second calculator subunit, configured to calculate the angle value to be adjusted of the heading axle according to the horizontal component of the deviation if the angle value to be adjusted of the roll axle is greater than the adjustable angle threshold of the roll axle.

7. The system of claim 6, wherein the communication module is further configured to receive a connection instruction and establish communication connection with the photographing device according to the connection instruction.

8. The system of claim 7, wherein the system for controlling the tracking photographing further comprises:
   a photographing controller module, configured to control the pitch axle, the roll axle, and the heading axle to stop moving and trigger the photographing device to perform photographing operation when a photographing instruction is received;
   an extension/retraction control module, configured to control extension/retraction of the support rod when a support rod extending/retracting instruction is received; and
   the communication module is further configured to disconnect the communication connection with the photographing device when a disconnection instruction is received.

* * * * *